United States Patent
Ducroquet et al.

(10) Patent No.: US 10,986,776 B2
(45) Date of Patent: Apr. 27, 2021

(54) FLOW RATE CONTROL FOR A COMBINE HARVESTER UNLOADING SYSTEM

(71) Applicant: AGCO Corporation, Duluth, GA (US)

(72) Inventors: Frederic Ducroquet, Hesston, KS (US); Joseph M. Biggerstaff, Hesston, KS (US); Gerald R. Johnson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 39 days.

(21) Appl. No.: 16/377,360

(22) Filed: Apr. 8, 2019

(65) Prior Publication Data

US 2019/0230854 A1 Aug. 1, 2019

Related U.S. Application Data

(63) Continuation of application No. 15/578,172, filed as application No. PCT/IB2016/000703 on May 24, 2016, now Pat. No. 10,292,327.

(60) Provisional application No. 62/167,922, filed on May 29, 2015, provisional application No. 62/167,923, filed on May 29, 2015.

(51) Int. Cl.
  *A01D 41/12* (2006.01)
  *A01D 41/127* (2006.01)
  *A01D 61/00* (2006.01)

(52) U.S. Cl.
  CPC ....... *A01D 41/1217* (2013.01); *A01D 41/127* (2013.01); *A01D 61/00* (2013.01)

(58) Field of Classification Search
  CPC ............ A01D 41/1208; A01D 41/1217; A01D 41/127; A01D 41/1226; A01D 41/1272; A01D 41/1275; A01D 61/00; A01D 61/004; A01D 75/02; A01D 61/008; A01F 12/60; A01F 12/46
  See application file for complete search history.

(56) References Cited

U.S. PATENT DOCUMENTS

| | | | | |
|---|---|---|---|---|
| 1,704,731 A | * | 3/1929 | Eggert | B65G 65/46 198/550.1 |
| 3,265,226 A | * | 8/1966 | Malcolm | A01F 12/46 414/502 |
| 3,356,270 A | * | 12/1967 | Heider | B60P 1/40 222/413 |
| 3,568,863 A | * | 3/1971 | Rohwedder | A01D 41/1208 414/526 |
| 3,669,291 A | * | 6/1972 | De Coene | A01F 12/16 414/502 |
| 3,841,536 A | * | 10/1974 | Maiste | A01D 41/1208 222/503 |
| 4,188,160 A | * | 2/1980 | Corbett | A01F 12/00 406/102 |

(Continued)

*Primary Examiner* — Adam J Behrens

(57) ABSTRACT

In a grain unloading system for a combine harvester a grain bin includes a frame, the frame has a floor with a trough. An unloading auger is disposed at least partially within the trough. An auger cover at least partially covers the auger. The auger cover has a hat for a top portion of the auger cover and a pair of gates movable between the hat and locations on the floor that are proximal to the trough. A gate adjustment structure is coupled to the pair of gates to move the pair of gates relative to the auger. A control system is coupled to the gate adjustment structure and configured to control the gate adjustment structure.

13 Claims, 15 Drawing Sheets

(56) References Cited

U.S. PATENT DOCUMENTS

| | | | | |
|---|---|---|---|---|
| 5,443,352 | A * | 8/1995 | Schuhmacher | A01D 41/1208 198/550.01 |
| 5,658,116 | A * | 8/1997 | Krull | B60P 1/40 105/282.3 |
| 6,339,917 | B1 * | 1/2002 | Dillon | A01D 41/02 460/114 |
| 6,367,234 | B1 * | 4/2002 | Hurlburt | A01D 41/1208 460/114 |
| 6,976,819 | B2 * | 12/2005 | Kulbeth | B65G 33/10 198/550.1 |
| 9,459,183 | B1 * | 10/2016 | Schnakenberg | G01N 1/04 |
| 2002/0014060 | A1 * | 2/2002 | Dillon | A01D 41/02 56/14.6 |
| 2015/0156968 | A1 * | 6/2015 | Lauwers | A01D 57/00 56/10.2 R |
| 2016/0286723 | A1 * | 10/2016 | Banks, Jr. | A01D 41/1226 |

* cited by examiner

FLOW RATE CONTROL FOR A COMBINE HARVESTER UNLOADING SYSTEM

CROSS REFERENCE TO RELATED APPLICATIONS

This application is a continuation of U.S. application Ser. No. 15/578,172, filed Nov. 29, 2017, now U.S. Pat. No. 10,292,327, entitled "FLOW RATE CONTROL FOR A COMBINE HARVESTER UNLOADING SYSTEM".

BACKGROUND OF THE INVENTION

Field of Invention

The present disclosure is generally related to combine harvesters and, more particularly, is related to grain unloading mechanisms of a combine harvester.

Description of Related Art

A combine harvester harvests crop and then unloads the harvested crop, such as grain, from a grain bin secured to a chassis of the combine harvester through an unloader tube and to the bed of a receiving vehicle, such as a truck or grain cart. Unloading systems on combine harvesters are continually being developed to unload grain faster. There are many perceived benefits to faster unloading, especially for the aspects of time to empty a grain bin and getting grain to trucks faster. A faster unload rate may help the entire harvesting operation run more efficiently as trucks are not waiting as long to get filled, enabling the trucks to return to the field faster so the maximum uptime of harvesting is achieved.

One perceived shortcoming to a faster unload rate is the potential difficulty in topping off a truck or grain cart. Another perceived shortcoming is that the startup torque for the system is generally high due to increased flow rates, which may drive investment into a more robust drive system to handle these peak loads. A variable speed drive system for the unloading system may be used, but it is very expensive and may still require high startup torque.

SUMMARY OF THE INVENTION

In accordance with one aspect of the invention there is provided a grain unloading system for a combine harvester comprising:
  a grain bin comprising a frame, the frame comprising a floor with a trough disposed therein;
  an unloading auger disposed at least partially within the trough;
  an auger cover that at least partially covers the auger, the auger cover comprising a hat for a top portion of the auger cover and a pair of gates movable between the hat and locations on the floor that are proximal to the trough;
  a gate adjustment structure coupled to the pair of gates to move the pair of gates relative to the auger; and,
  a control system coupled to the gate adjustment structure and configured to control the gate adjustment structure.

Further features and aspects of the invention are defined by the dependent claims appended hereto.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Figure 1:
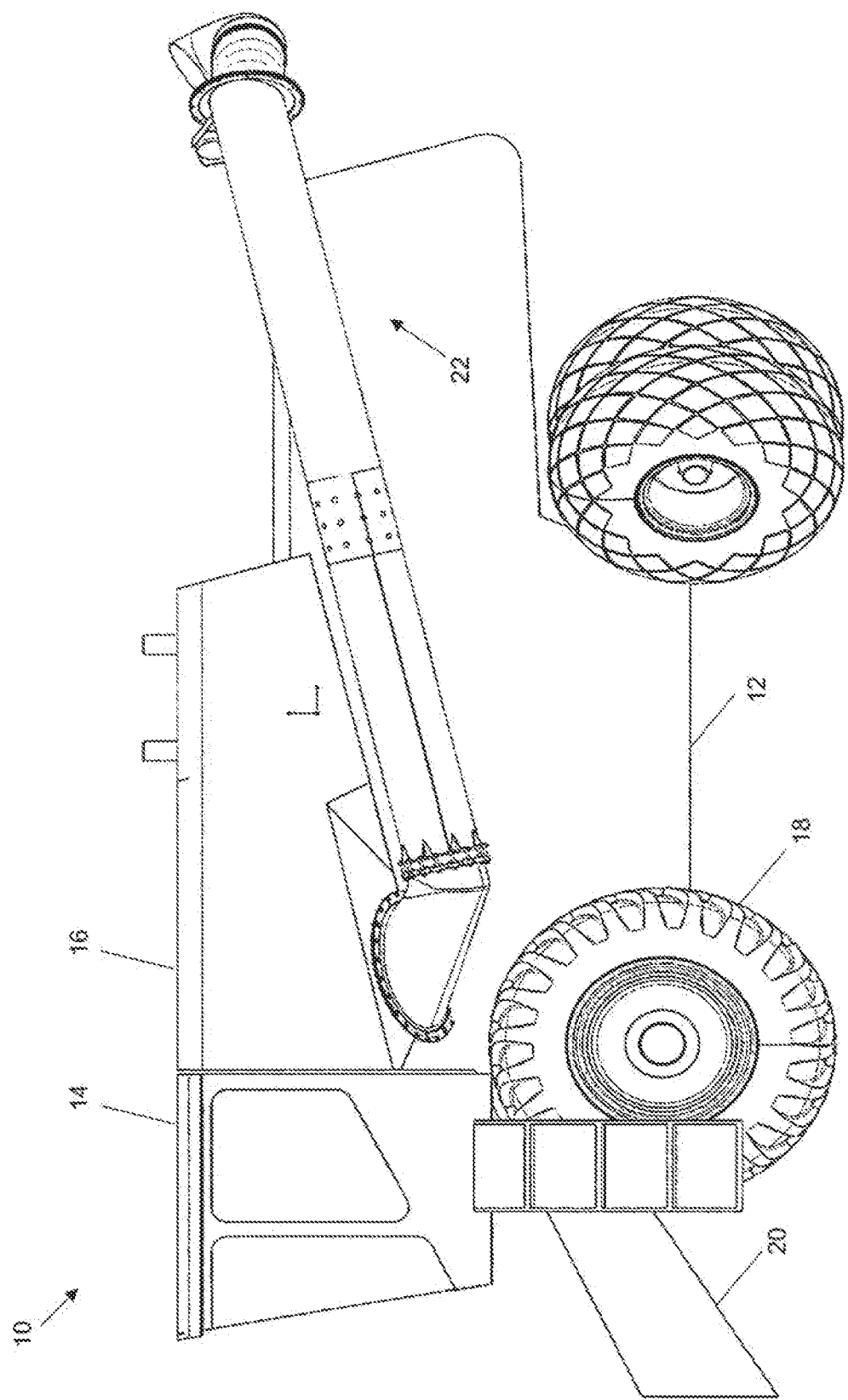
FIG. 1 is a schematic diagram that illustrates an example combine harvester equipped with an embodiment of a grain flow rate control system.

Certain embodiments of a grain flow rate control system and method are disclosed that use a gate system over cross augers of a grain bin of a combine harvester to control the flow of grain evacuated from the grain bin. In effect, certain embodiments of the grain flow rate control system choke off the flow of grain to the cross augers, which in turn reduces the grain flow rate out of the grain bin.

Digressing briefly, some conventional unloader systems evacuate the grain bin according to a constant rate, which may result in spillage of grain and/or difficulty in topping off the grain in the receiving vehicle. In systems that use variable grain flow rates, the benefits of improved control to avoid spillage may be countered by the extra equipment costs of such systems. In contrast, certain embodiments of a grain flow rate control system may variably, or incrementally, adjust the grain flow rate without incurring significant equipment investment, providing for soft start and soft stop functionality when a corresponding unloader functionality is engaged or disengaged, respectively, and in some embodiments, more finite control of grain unloading that may be important in topping off scenarios.

Having summarized certain features of a grain flow rate control system of the present disclosure, reference will now be made in detail to the description of a grain flow rate control system as illustrated in the drawings.

FIG. 1 is a schematic diagram that illustrates an example combine harvester 10 equipped with an embodiment of a grain flow rate control system. One having ordinary skill in the art should appreciate in the context of the present disclosure that the combine harvester 10 and associated components are merely illustrative, and that other configurations and arrangement of components may be used in some embodiments. For instance, in the description that follows, emphasis is placed on a combine harvester 10 with an axial rotor design, though it should be appreciated that combine harvesters of other types of designs, such as transverse rotor, hybrid, dual rotor, etc. may be used in some embodiments. As is known, the combine harvester 10 comprises a chassis 12, a cab 14, a grain bin 16, and an engine and drive mechanisms that drive one or more wheels 18 (e.g., the front wheels in the depicted embodiment), as is well-known in the art. It should be appreciated that other mechanisms of travel may be used, such as track-based transportation. The combine harvester 10 is coupled at the cab end to a harvesting header (not shown) via a feeder house 20, as is known.

In operation, as is well understood by those having ordinary skill in the art, the harvesting header delivers collected crop materials to the front end of the feeder house 20. Such materials are moved upwardly and rearwardly within the feeder house 20, and further conveyed rearwardly (e.g., by an optional beater) to a rotary processing device, such as one or more rotors having an infeed auger on the front end thereof. The auger, in turn, advances the materials axially into a processing system for threshing and separating. Generally speaking, the crop materials entering the processing system move axially and helically therethrough during threshing and separating operations.

During such travel the crop materials are threshed and separated by the rotor(s) operating in cooperation with foraminous, arcuate processing members in the form of threshing concave assemblies and separator grate assemblies. Bulkier stalk and leaf materials are retained by the concave and grate assemblies and are impelled out the rear of the processing system and ultimately out of the rear of the combine harvester 10. Crop material expelled from the rotor and through the respective concave and separator grate assemblies flow through a cleaning system, which may comprise return and stratification pans and a shoe that comprises chaffer and sieve assemblies. With the aid of a fan or blower that provides forced air through a duct assembly to the shoe, lighter chaff particles are separated from the grain and passed out of the rear of the combine harvester 10, whereas the grain is conveyed (e.g., via a conveyor, such as an auger) to the grain bin 16. The grain bin 16 comprises one or more conveyors, such as one or more cross augers, which convey the grain to an auger of an unloader tube assembly 22.

Figure 2A:
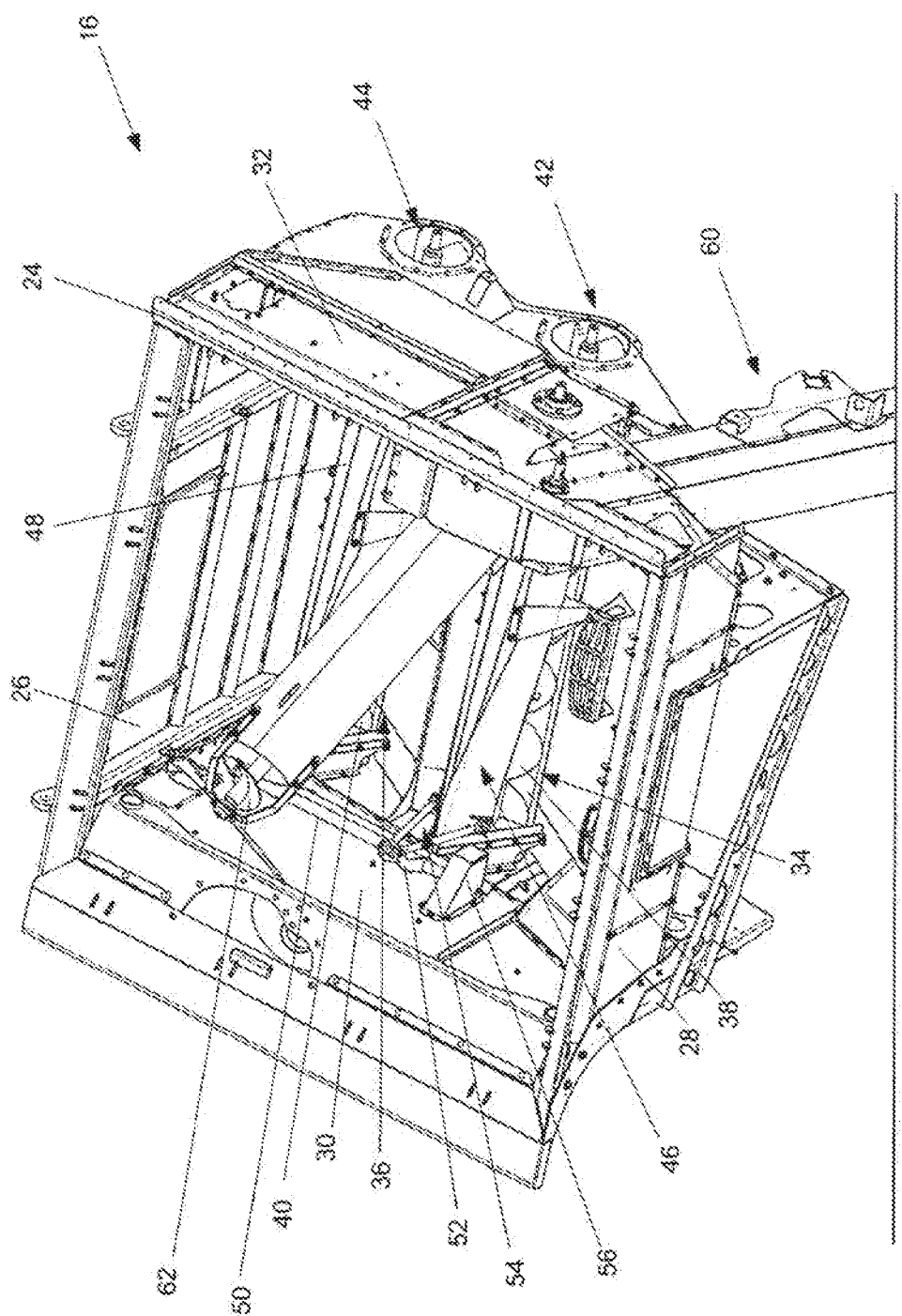
FIGS. 2A-2C are schematic diagrams that illustrate several views of a grain bin of a combine harvester and an embodiment of a grain flow rate control system working in conjunction with the grain bin.
Figure 2B:
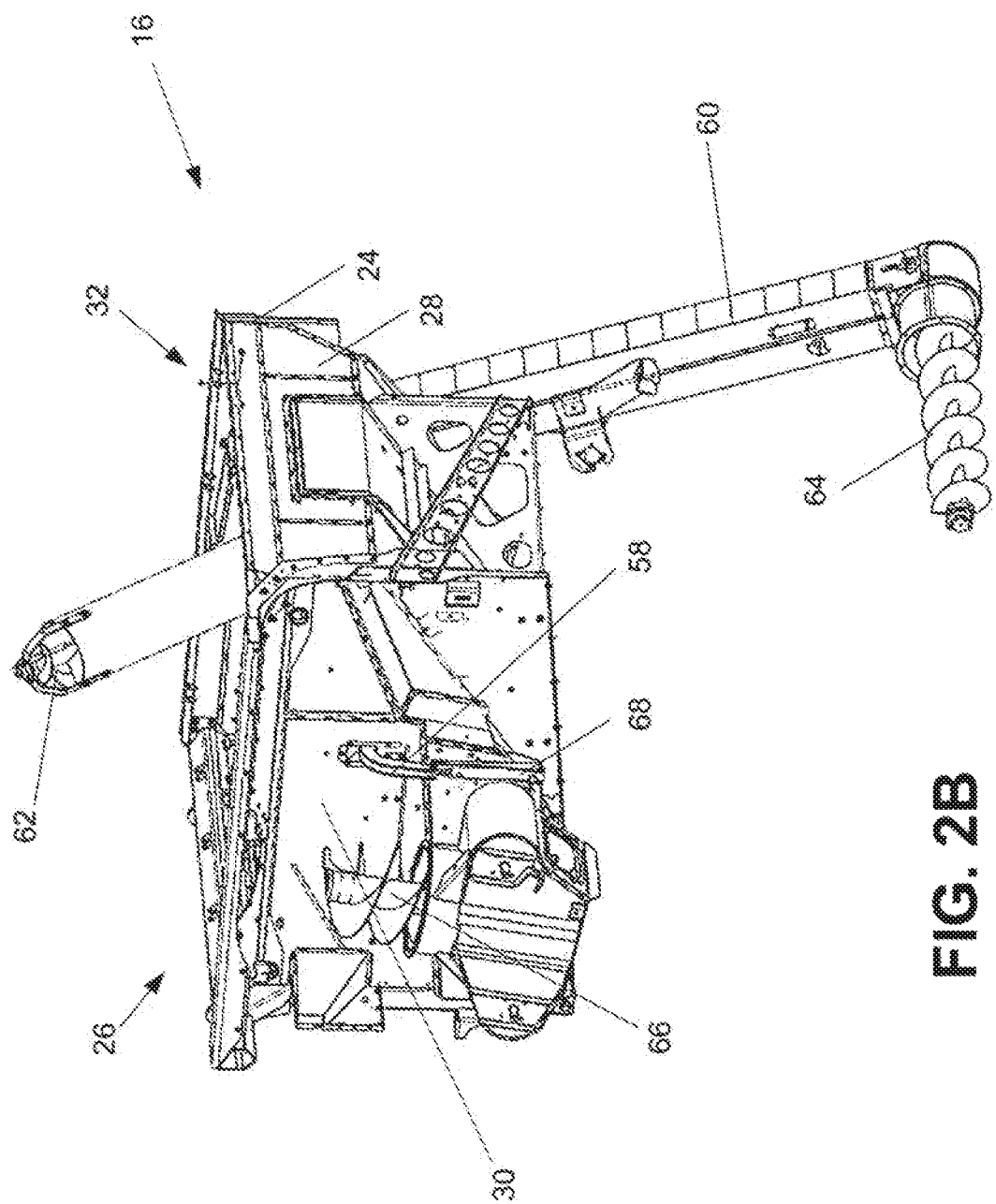
Figure 2C:
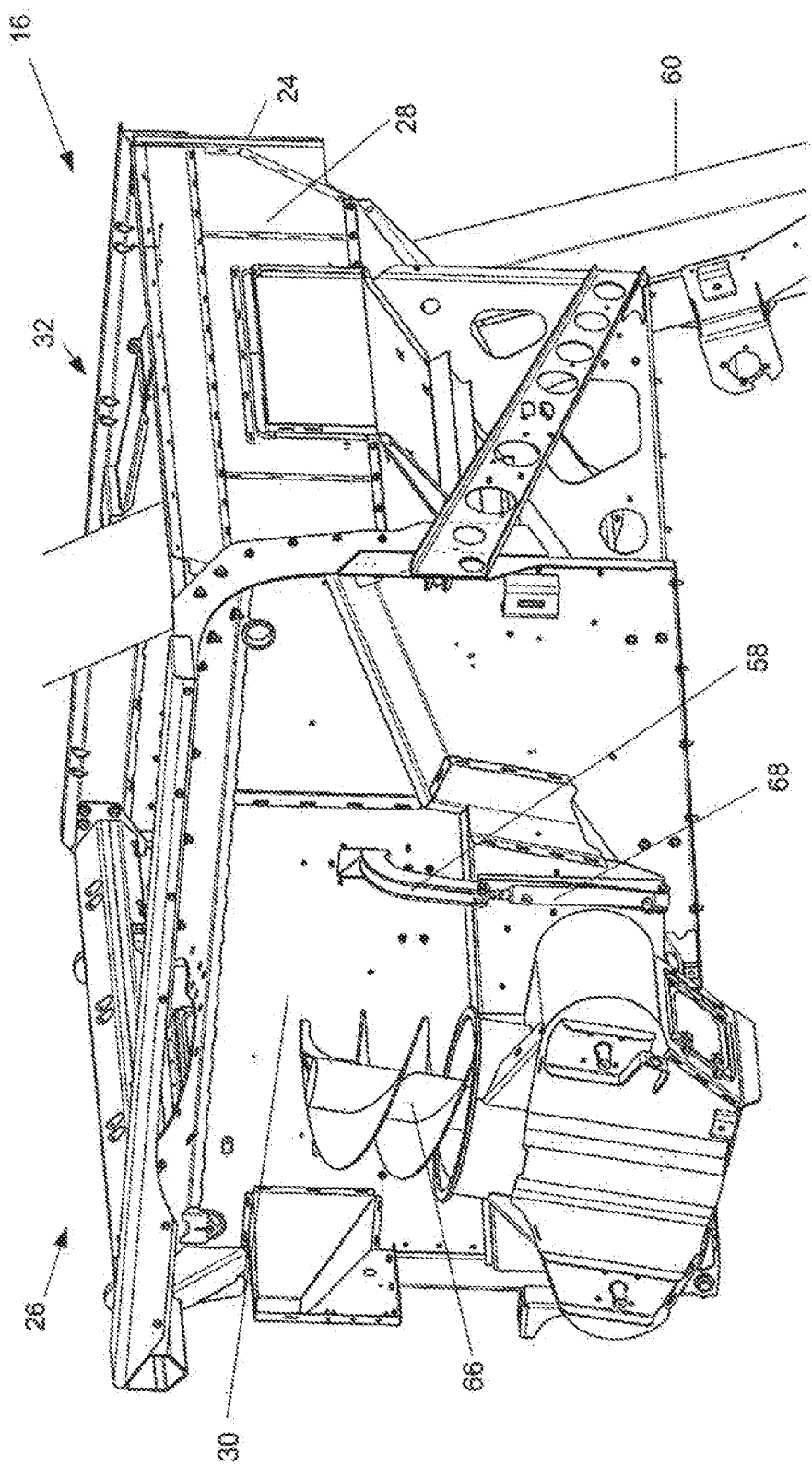

Having generally described select components and operations of the combine harvester 10, attention is directed to FIGS. 2A-2C, which are schematic diagrams that illustrate several views of the grain bin 16 and an embodiment of a grain flow rate control system working in conjunction with the grain bin 16. It should be appreciated by one having ordinary skill in the art that the design of the grain bin 16 shown in FIGS. 2A-2C is one example structure, and that in some embodiments, a different structure may be used.

The grain bin 16 comprises a substantially rectangular frame 24 with respective upstanding front and rear walls 26, 28, and respective left and right upstanding side walls 30, 32. The front wall 26 is proximal to the cab 14 (FIG. 1) of the combine harvester 10 (FIG. 1). One or more portions of the frame 24 may be angled in some embodiments. Proximal to the lower portion of the frame 24 are plural troughs 34 (rear) and 36 (front) that extend (transversely) between the side walls 30, 32. Disposed within the plural troughs 34 and 36 are respective cross augers 38 and 40 (mostly obscured in these views).

The cross augers, or simply hereinafter, augers 38, 40, comprise respective shafts that are accessed by (and rotated by) a driving mechanism (e.g., belt assembly, U-joint, etc.) via respective wall openings 42, 44 on the right hand side of the grain bin 16 in known manner. The augers 38, 40 are substantially covered by respective auger covers 46, 48.

In the depicted embodiment, the auger covers 46 and 48 are operably coupled to a rotatable shaft 50, enabling simultaneous movement (e.g., raising and lowering) of the auger covers 46, 48. In some embodiments, a different assembly or control mechanism may be used to enable independent movement of the auger covers 46, 48. The auger cover 46 is operably coupled to the rotatable shaft 50 via a crank 52 and link assembly 54. The crank 52 is fixably secured to the shaft 50, rotating in kind with the shaft 50. The crank 52 is pivotably coupled to the link assembly 54, such as via a pin, ball bearings, ball joint, etc. In one embodiment, the link assembly 54 comprises two links (e.g., metal members) that are secured (e.g., by bolt, screw, etc.), at one end of a pair of moveable gates of the auger cover 46, at opposing (front and back) bottom ends of the gates of the auger cover 46. The front and rear, lower ends of the gates of the auger cover 46 to which the links are secured are proximal to the left side wall 30, or stated otherwise, closest to the discharge end of the corresponding auger 38.

In a sense, the link assembly 54 straddles the auger cover 46 at one end. Upon rotation of the rotatable shaft 50, the crank 52 likewise rotates, which in turn causes the link assembly 54 to raise the gates of the auger cover 46 in a skewed manner. That is, the left end of the gates of the auger cover 46 is raised more than the right end of the gates of the auger cover 46, enabling a variable or incremental flow of grain feeding into the auger 38.

The other auger cover 48 is also operably coupled to the shaft 50 in similar manner, enabling a similar operation. Note that for single auger/auger cover embodiments, the auger cover, gate pairs, and crank that is driven by a bell crank may be omitted, and the retained crank for the retained auger/auger cover may be directly connected to an actuator.

A cover 56 is shown in FIG. 2A, which provides a protective housing for the linkage between the shaft 50 and a lever 58 (see FIGS. 2B-2C), and which also may house a sensor (e.g., potentiometer, etc.) to detect the absolute positions or relative positions of the respective gates of the auger covers 46, 48. That is, the sensor may be used by a control system of an embodiment of a grain flow rate control system to adjust the positioning of the gates of the auger covers 46 and 48. In one embodiment, the gates may be controlled to infinitely variable positions (as programmed by the control system), or in some embodiments, the gates may be controlled to a predetermined number of set points, such as four (4) set points (e.g., 0%, 25%, 75%, 100% opening), among other set point values and/or quantities as desired. Also depicted in FIG. 2A is a grain conveyor housing 60, which houses a conveyor that conveys cleaned grain transferred from the shoe up and along the right hand side of the grain bin 16.

In one embodiment, the grain conveyor housing 60 includes one or more sensors, such as to detect the moisture content of the grain. Grain moisture has a direct influence on the amount of power required for a grain unloading system. Generally, the more moisture present in the grain, the more power it takes to convey the grain. A control system of certain embodiments of a grain flow rate control system may use the input from the moisture sensor to effect control and positioning (e.g., percentage of opening or settings) of the gates of the auger covers 46 and 48. Note that, in some embodiments, the sensors for moisture detection may be located elsewhere on the combine harvester 10 (FIG. 1). The conveyor housed within the grain conveyor housing 60 couples to an auger 62 adjustably disposed within the interior of the grain bin 16 (e.g., via a U-joint or other well-known coupling mechanisms) to transfer the grain from the grain conveyor housing 60 to the interior of the grain bin 16.

On the other side of the grain conveyor housing 60, as shown in FIG. 2B, is a conveyor 64 (e.g., auger) that receives the grain from the shoe and transfers the grain to the conveyor (e.g., auger) housed within the grain conveyor housing 60. Additionally shown in FIGS. 2B and 2C is a conveyor (e.g., auger) 66 of the unloader tube assembly 22 (FIG. 1), which receives the grain conveyed by the augers 38, 40 (FIG. 2A) and transports the grain out of the discharge end of the unloader tube assembly 22 and into a receiving vehicle or apparatus. Further, FIGS. 2B and 2C show a hydraulic cylinder 68 that is coupled to the lever 58. In some embodiments, other types of actuable devices (e.g., electric, pneumatic, mechanical) may be used. When activated (such as via a control valve that comprises an actuator (e.g., solenoid) that receives a control signal from an electronic control unit (ECU) and responsively, actuates the control valve in known manner to enable a change in flow through the control valve and to the ports of the hydraulic cylinder), the hydraulic cylinder 68 causes movement of the lever 58, which in turn, causes rotation of the shaft 50 (FIG. 2A), resulting in the raising or lowering of the respective pair of gates of the auger covers 46, 48 (FIG. 2A) to achieve variable or incremental controlled flow of the grain to and subsequently from the unloader tube assembly 22.

Figure 3:
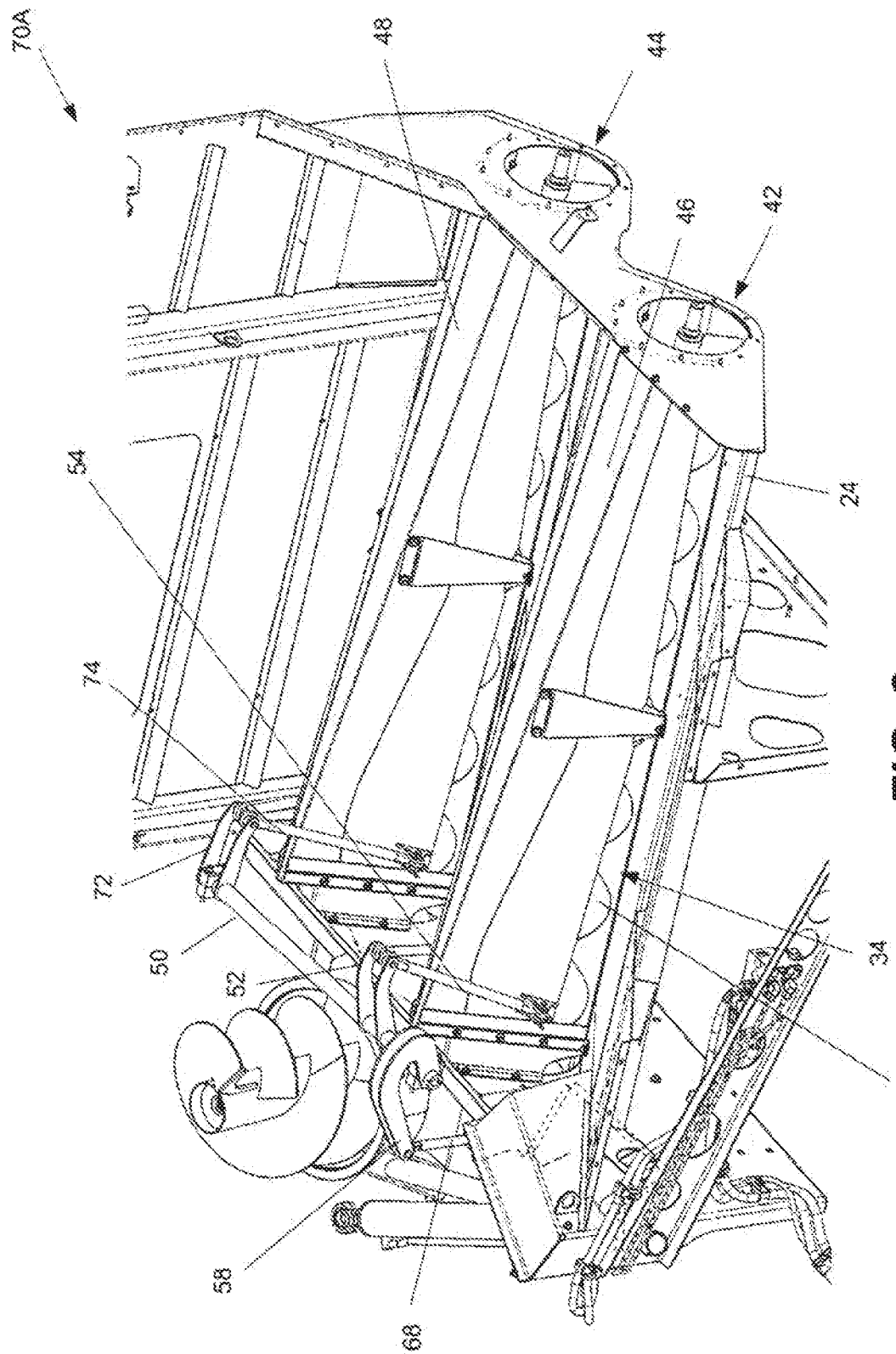
FIG. 3 is a schematic diagram that illustrates, in overhead perspective view, an embodiment of a gate adjustment structure of a grain flow rate control system.

FIG. 3 is a schematic diagram that illustrates, in overhead perspective view, an embodiment of a gate adjustment structure 70A used in an embodiment of a grain flow rate control system. The gate adjustment structure 70A comprises an assembly for adjusting a respective pair of gates (described further below) of one or more auger covers, the assembly including the shaft 50, the crank 52, the link assembly 54, and the auger cover 46 covering the underlying auger 38. In some embodiments, the gate adjustment structure 70A may comprise fewer or additional components. As shown, the auger cover 46 partially covers the corresponding auger 38, which is disposed between the auger cover 46 and locations on or near the floor (proximal to the trough 34) of the frame 24.

The gate adjustment structure 70A further comprises a crank 72 and link assembly 74 for adjusting a respective pair of gates (described further below) of the auger cover 48. The crank 72 is fixably coupled to the shaft 50, and pivotably coupled to the link assembly 74. The link assembly 74 comprises two links that are pivotably coupled (e.g., via ball bearings, pins, ball joints, etc.) to the crank 72, and pivotably secured at one end (e.g., proximal to the left side wall 30 (FIG. 2A), omitted in FIG. 3) of the pair of gates of the auger cover 48, and in particular, to lower, opposing exterior sides of the gates of the auger cover 48 (similar to the assembly comprising the crank 52, link assembly 54, and pair of gates of the auger cover 46). Also shown is the lever 58 (with the cover 56 omitted from this view), which in one embodiment couples to the shaft 50 via a ball joint, though in some embodiments, other coupling mechanisms may be used. The lever 58 is shown in a position (caused by movement of the hydraulic cylinder 68) that enables the auger covers 46, 48 to be in a lowered position. The other referenced components, including the side wall openings 42 and 44, have been described above and hence discussion of the same is omitted here for brevity.

Figure 4:
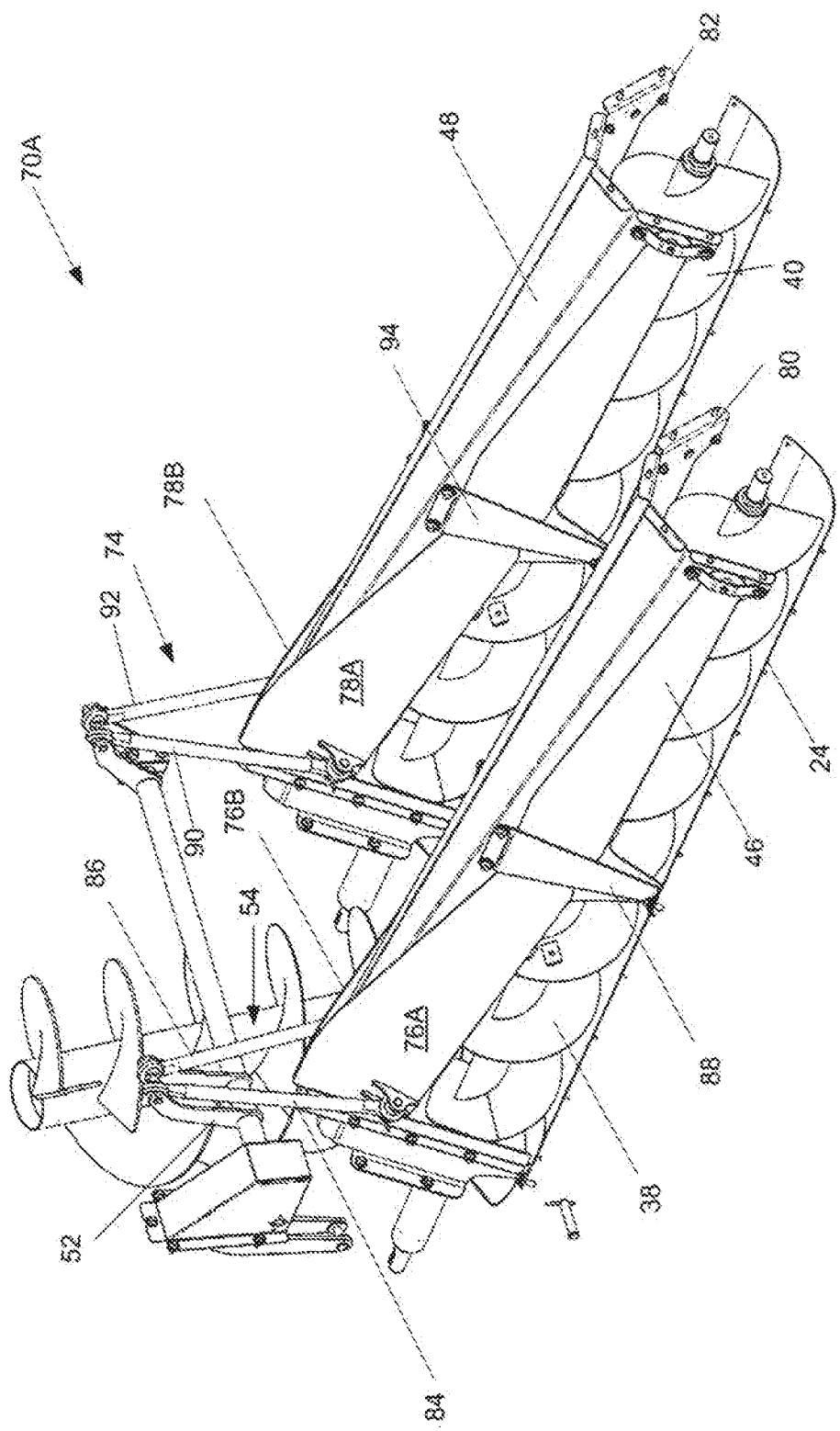
FIG. 4 is a schematic diagram that illustrates, in fragmentary perspective view, an embodiment of a gate adjustment structure of a grain flow rate control system.

FIG. 4 is a schematic diagram that illustrates, in fragmentary perspective view, the gate adjustment structure 70A depicted in FIG. 3, with several of the surrounding structures shown in FIG. 3 omitted. The gate adjustment structure 70A is shown with the auger covers 46 and 48 with gates in the raised positioned, revealing the underlying respective augers 38 and 40. Notably, the gates of the auger covers 46 and 48 are raised in a skewed manner, such that the opening at the discharge side (left hand side in FIG. 4) of the augers 38 and 40 is greater in area than the right hand side (in FIG. 4) of the augers 38, 40. In other words, the space between the interior of the auger covers 46 and 48 and the respective augers 38 and 40 is greater at the discharge side of the augers 38 and 40 than the space between the interior of the auger covers 46 and 48 and the respective augers 38 and 40 on the opposite end (right hand side, proximal to the right hand side wall 32 (FIG. 2A)).

In one embodiment, and as referenced above, the auger covers 46 and 48 each comprises multiple segments, including respective gates 76 (76A as shown, and a mirrored gate 76B that is only partially visible given the perspective of FIG. 4) and 78 (78A as shown, and a mirrored gate 78B that is only partially visible given the perspective of FIG. 4) and respective hats 80 and 82.

Referring to the auger cover 46, each of the gates 76 (e.g., 76A and 76B) of the auger cover 46 is secured to each link 84 and 86 of the link assembly 54, the connection made at the lower portion of the gates 76 proximal to the end of the auger cover 46 nearest the left side wall 30 (FIG. 2A). The respective connection of the links 84 and 86 to the gates 76A and 76B are pivotal connections (e.g., via ball bearing, pin, ball joint, etc.), enabling a somewhat rotational lifting and lowering of the gates 76A and 76B. The other end of the gates 76 are secured (e.g., bracketed) to the lower portion of the hat 80 (e.g., each gate 76A and 76B is secured to opposing sides of the hat 80), proximal to the non-discharge end of the auger cover 46. Disposed in between (e.g., half-way) both the connections of the gates 76 to the link assembly 54 and the gates 76 to the hat 80 is a guide member 88 (e.g., bracket, and also a mirrored bracket on the other side of the gate 76 that is obscured from view) that is secured to the hat 80, enabling guided and restricted movement of the gates 76. The hat 80 is shown as a having a semi-cylindrical shape that partially covers the underlying auger 38 and extends the length of the auger cover 46. In some embodiments, the hat 80 may be configured according to other geometries and/or coverage areas.

Referring to the auger cover 48, each of the gates 78 (e.g., 78A and 78B) of the auger cover 48 is secured to respective links 90 and 92 of the link assembly 74, the connections made at the lower portion of the respective gates 78 proximal to the end of the auger cover 48 nearest the left side wall 30 (FIG. 2A). The respective connection of the links 90 and 92 to the gates 78A and 78B are pivotal connections (e.g., via ball bearing, pin, ball joint, etc.), enabling a somewhat rotational lifting and lowering of the gates 78A and 78B. The other end of the gates 78 are secured (e.g., bracketed) to the lower portion of the hat 82 (e.g., each gate 78A and 78B is secured to opposing sides of the hat 82), proximal to the non-discharge end of the auger cover 48.

Disposed in between (e.g., half-way between) both the connections of the gates 78 to the link assembly 74 and the gates 78 to the hat 82 is a guide member 94 (e.g., bracket, the other bracket on the front-facing side of the gate 78B obscured from view) that is secured to the hat 82, enabling guided and restricted movement of the gates 78. The hat 82 is shown as a having a semi-cylindrical shape that partially covers the underlying auger 40 and extends the length of the auger cover 48. In some embodiments, other geometries and/or coverage areas may be used.

Note that the portion of the respective gates 76 and 78 disposed between the left side wall 30 (FIG. 2A) and the respective guide member 88, 94 is configured to permit a gap between the floor of the frame 24 and the bottom edge of the gates 76 and 78, the gap gradually decreasing from left to right. Such a gap may enable a fail-safe mode of grain conveyance, such as if the raising operation of the respective pair of gates 76, 78 of the auger covers 46 and 48 becomes disabled and the pair of gates 76, 78 remain in the closed position. In such circumstances, a flow of grain is still permitted via the gap. In some embodiments, the aforementioned portions may not be configured to permit a gap, and fail safe modes may be achieved using other mechanisms, such as mechanical stops coupled to the shaft 50 that disallow a fully closed position (flush or substantially with the interior frame floor) of the respective pair of gates 76, 78 of the auger covers 46 and 48, or a control system that causes the closing position to be at a value greater than 0% opening (e.g., 5%, 10%, etc.), among other mechanisms.

Though described with particularity in association with FIG. 4, some embodiments of the gate adjustment structure may be achieved with different structures for the auger covers 46 and 48 that perform an equivalent function through the raising and lowering of the respective pair of gates 76 and 78 of the auger covers 46 and 48, and hence are contemplated to be within the scope of the disclosure.

Figure 5A:
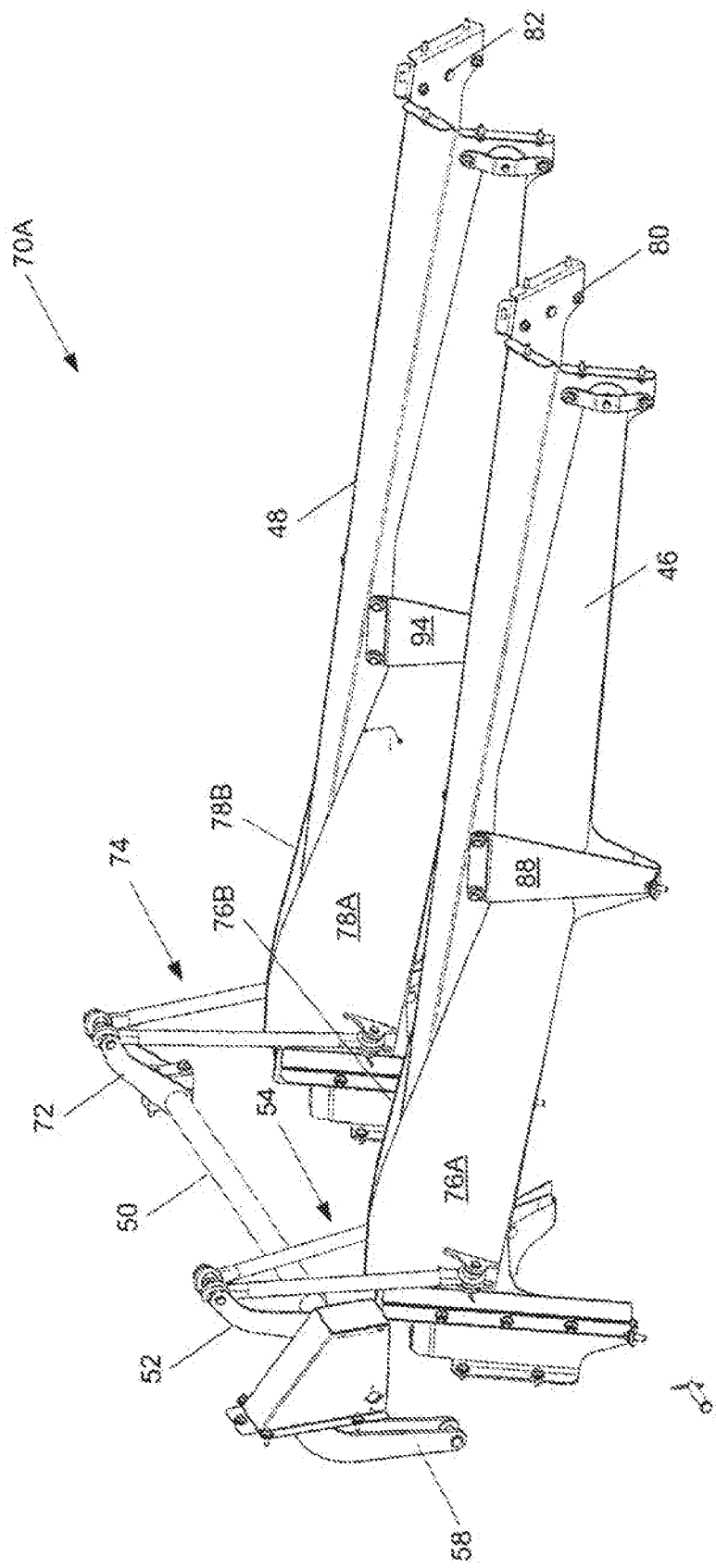
FIGS. 5A-5B are schematic diagrams that illustrate in side perspective views, raising and lowering of a respective pair of gates of plural auger covers of an embodiment of a gate adjustment structure of a grain flow rate control system.
Figure 5B:
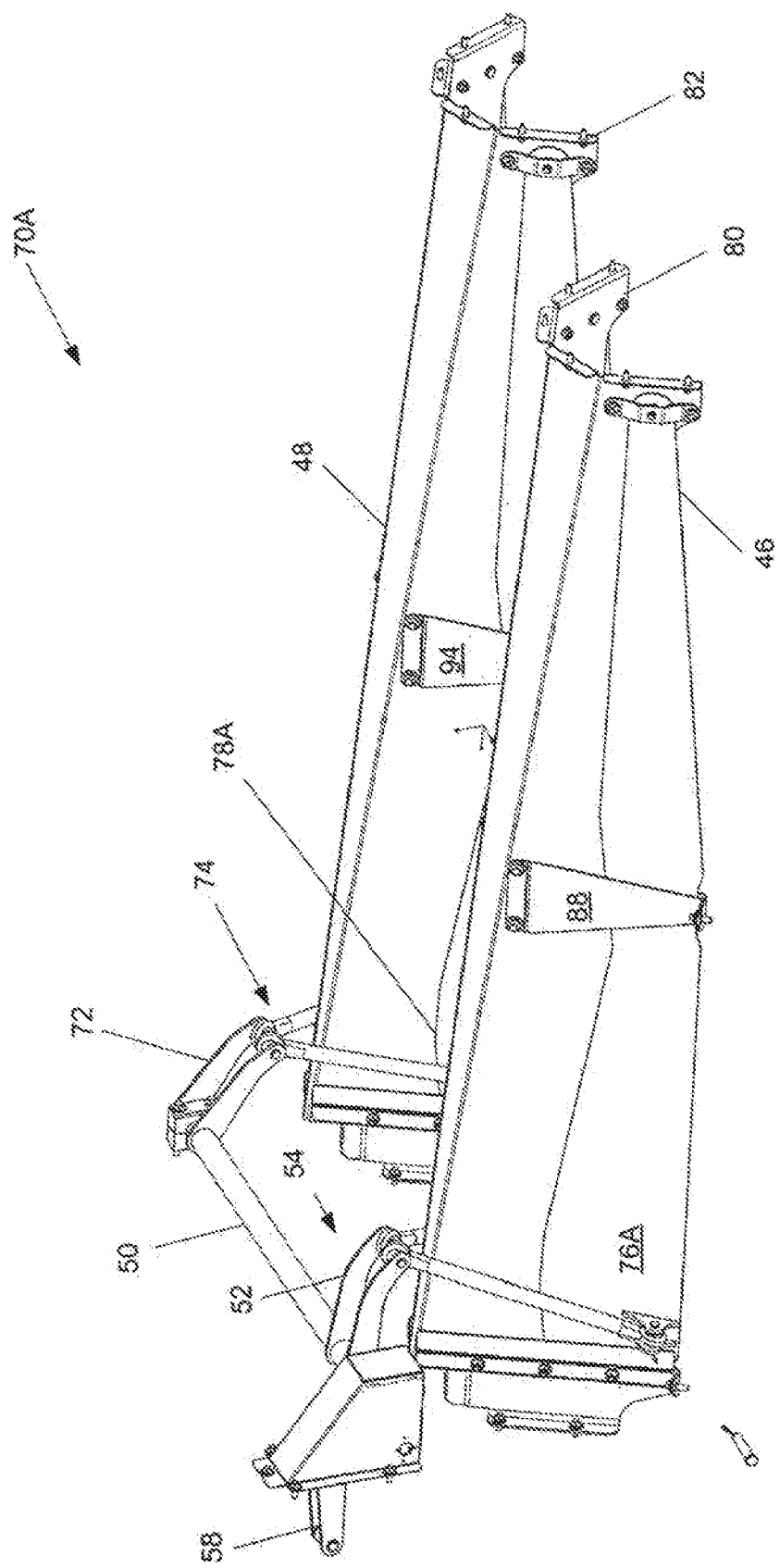

FIGS. 5A-5B are schematic diagrams that illustrate in side perspective views, raising and lowering of the respective pair of gates 76 and 78 of the auger covers 46 and 48 of an embodiment of the gate adjustment structure 70A. Referring to FIG. 5A, the respective gates 76 (76A and 76B) and 78 (78A and 78B) of the auger covers 46 and 48 are depicted in the raised position. Note that the lever 58 (which in one embodiment is part of the gate adjustment structure 70A), which couples to a hydraulic cylinder 68 (FIG. 2C), is shown in a lowered position. The lever 58 is coupled to the shaft 50 (e.g., via a ball joint connection), and when the lever 58 is lowered as shown, the shaft 50 rotates, causing the cranks 52 and 72 to coincidently rotate upward.

Note that the cranks 52 and 72 each comprise two (2) parallel-arranged, angled brackets that are fixably secured to the shaft 50 and pivotably coupled to the respective link assemblies 54 and 74, as described previously. By rotating upward, the cranks 52 and 72 likewise cause the link assemblies 54 and 74 to move upwards. The link assemblies 54 and 74 are coupled to the respective pair of gates 76 (76A and 76B) and 78 (78A and 78B), causing upon crank action the gates 76 and 78 to raise in a skewed manner relative to the respective hats 80 and 82.

As noted previously, the movement of the gates 76 and 78 are guided by the guide members 88 and 94 (which have respective other halves of the pair on the other side of the auger covers 46 and 48 that are obscured from view), respectively. In this position, the resulting gap between the bottom edges of the gates 76 and 78 enables a greater grain flow output at the discharge end of the augers 38 and 40 (FIG. 4), wherein the gap distance is skewed such that there is more of a gap at the discharge end of the augers 38 and 40 (FIG. 4) than at the opposite end of the auger covers 46 and 48. Note that a gap created in the closed position, whether achieved structurally by the geometry of the gates 76 and 78, by a mechanical stop, and/or by a control system that automatically positions the gates to a predetermined percentage opening, enables a fail-safe mode of operation should there be a structural or other type of failure that disables the opening of the gates 76 and 78. That is, despite the disablement, an operator may still evacuate the grain bin 16 (FIG. 1), albeit at a much slower rate, preventing (or reducing the risk of) the operator from having to enter the grain bin 16 (FIG. 1) and digging the grain out of the grain bin.

Referring to FIG. 5B, the lever 58 is shown in a raised position (somewhat similar to the orientation shown in FIG. 3), which causes rotation of the shaft 50 downward. The downward rotation of the shaft 50 results in the fixably coupled cranks 52 and 72 rotating downward, which in turn causes the link assemblies 54 and 74 to lower the respective gates 76 and 78 (gates 76A, and not shown, 76B, and partially shown 78A, and not shown, 78B) through their respective connections to the gates 76 and 78. As noted by comparison to FIG. 5A, the gates 76 and 78 are guided by respective guide members 88 and 94 (on both sides of the auger covers 46, 48, though the other sides obscured from view) to slide across the respective hats 80 and 82, closing the gap between the bottom edge of the gates 76 and 78 and the frame 24 (FIG. 2A).

Figure 6A:
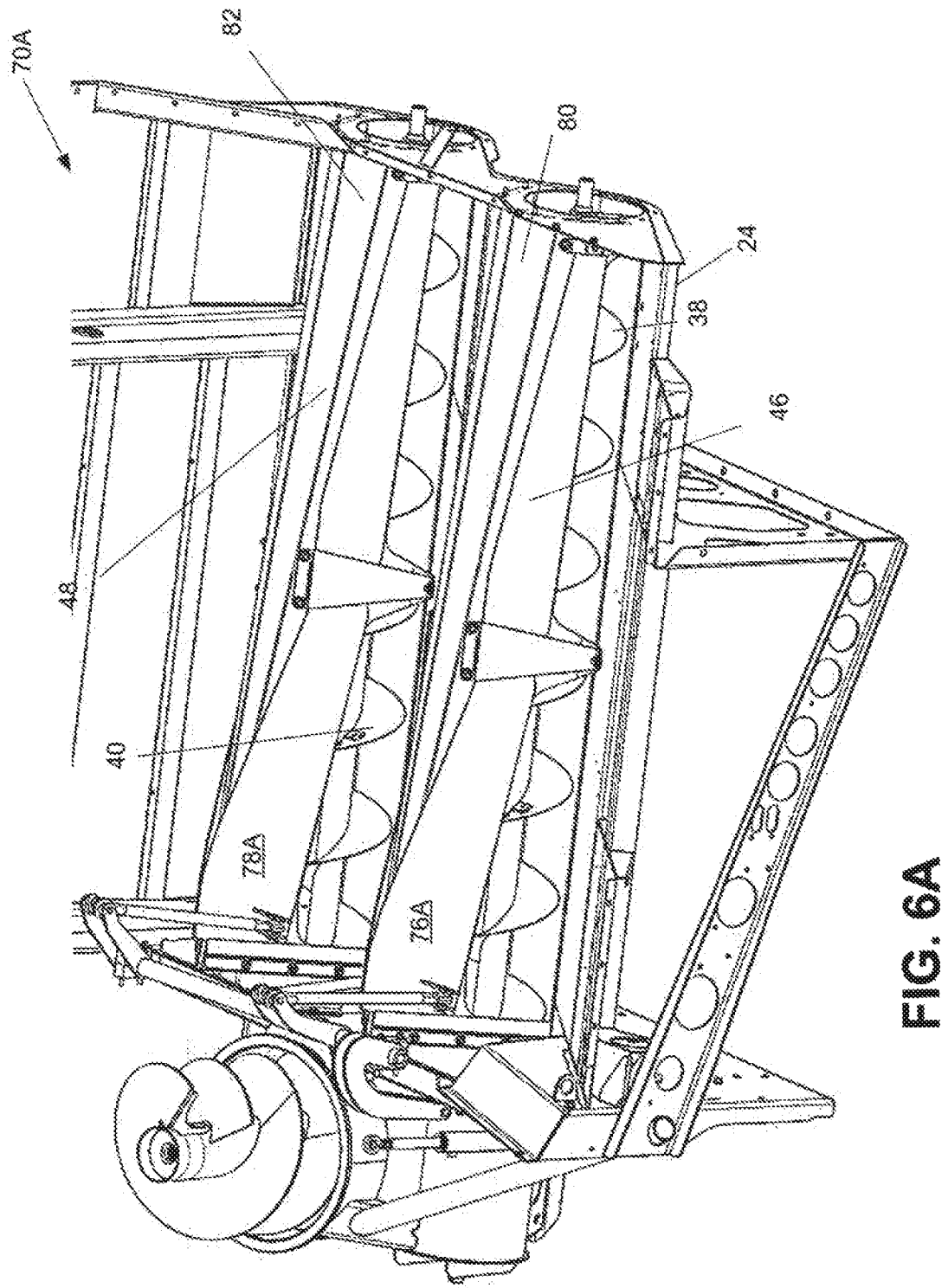
FIGS. 6A-6B are schematic diagrams that illustrate, in rear perspective views, raising and lowering of a respective pair of gates of plural auger covers of an embodiment of a gate adjustment structure of a grain flow rate control system.
Figure 6B:
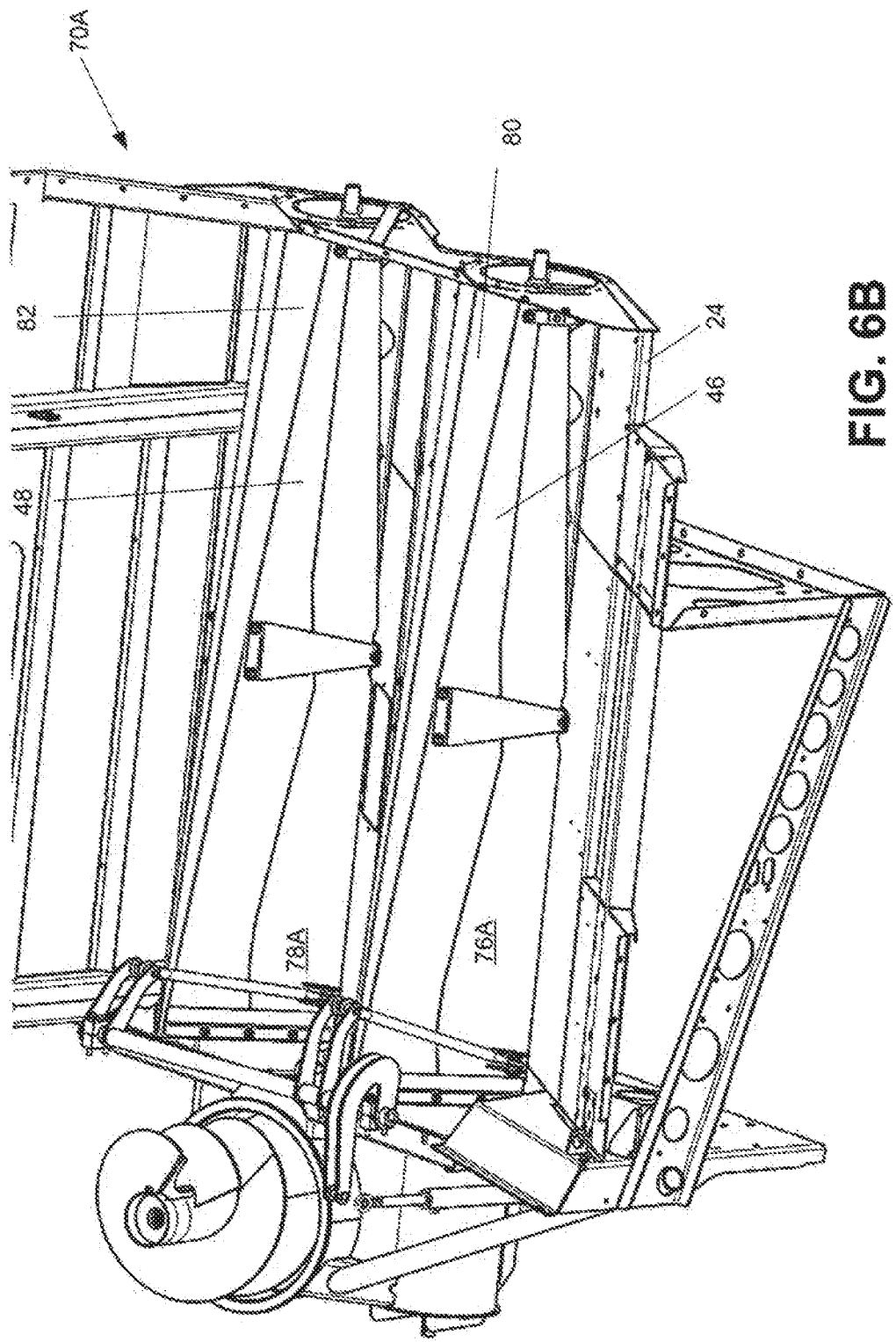

FIGS. 6A-6B are schematic diagrams that illustrate, in rear perspective views, raising and lowering of the auger covers 46 and 48 of an embodiment of a gate adjustment structure 70A. In the raised position, as shown in FIG. 6A, the gates 76 and 78 (gate halves 76A and 78A are shown, the other halves obscured from view but with similar action) are raised relative to the respective hats 80 and 82, resulting in a skewed gap between the bottom edges of the gates 76 and 78 and the frame 24 (floor). In other words, an increasing amount of the underlying augers 38 and 40 are covered when viewed from left to right in FIG. 6A and hence an increasing amount of grain in the grain bin 16 (FIG. 1) is fed to the augers 38 and 40.

Referring to FIG. 6B, the auger covers 46 and 48 are in the lowered position, wherein the gates 76 and 78 (gates 76A and 78A shown, the other halves obscured from this view) have slid past the respective hats 80 and 82 to decrease the gap between the lower edges of the gates 76 and 78 and the frame 24, and hence choke the flow of grain in the grain bin 16 (FIG. 1) to the underlying augers 38 and 40 (FIG. 6A). Note that in this embodiment, there is a small gap, in the lowered position, between the right hand side (right hand side when viewing FIG. 6B) lower edge portion of the gates 76 and 78 and the frame 24 (as opposed to being on the left hand side portion). As noted in part previously, the gap above the floor of the frame 24 in the lowered position may be on the left hand side and/or the right hand side, or there may be no significant gap created by the structure or geometry of the gates 76 and 78 at all in some embodiments.

Figure 7A:
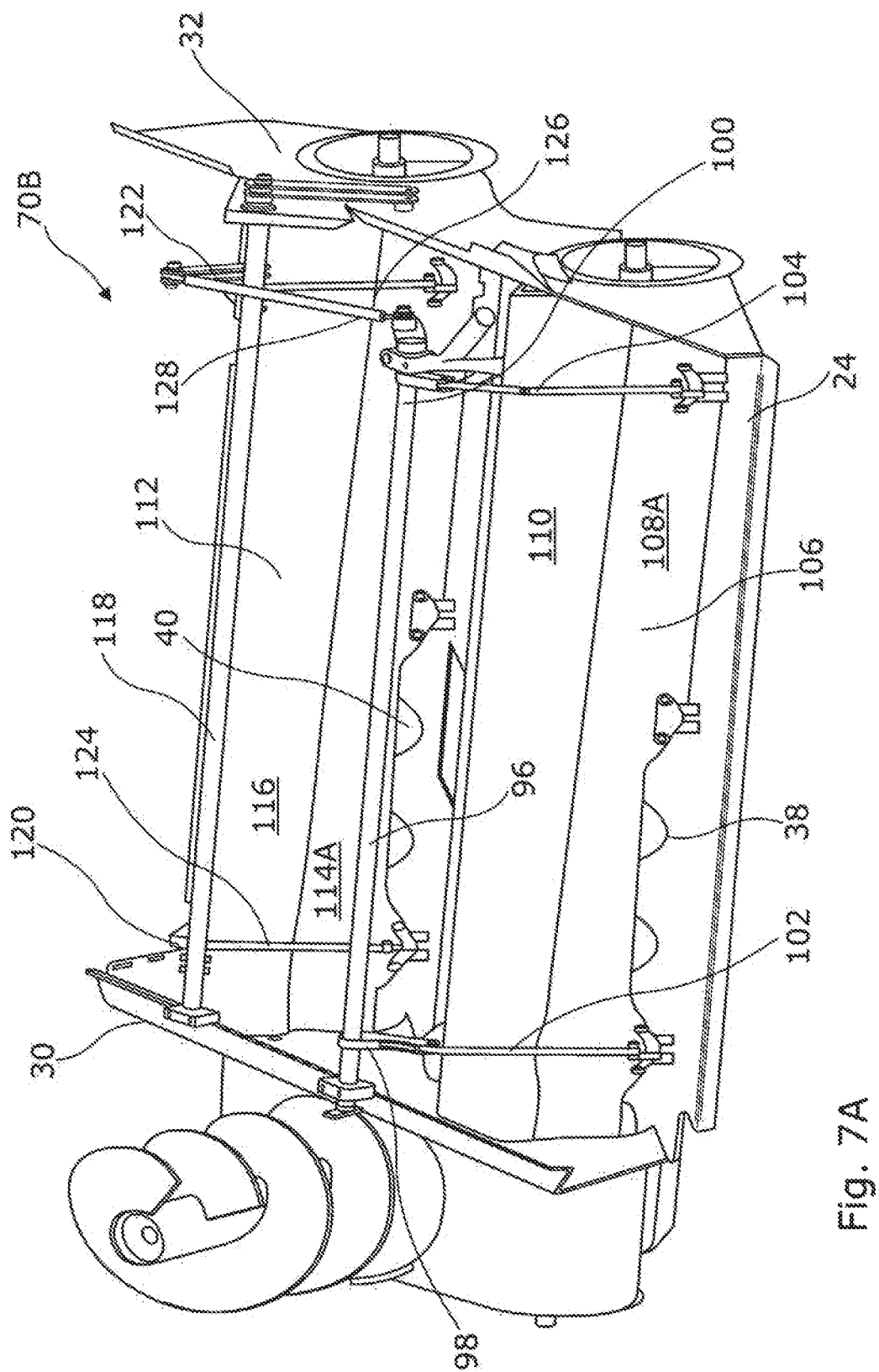
FIGS. 7A-7B are schematic diagrams that illustrate, in rear perspective views, another embodiment of a gate adjustment structure of a grain flow rate control system.
Figure 7B:
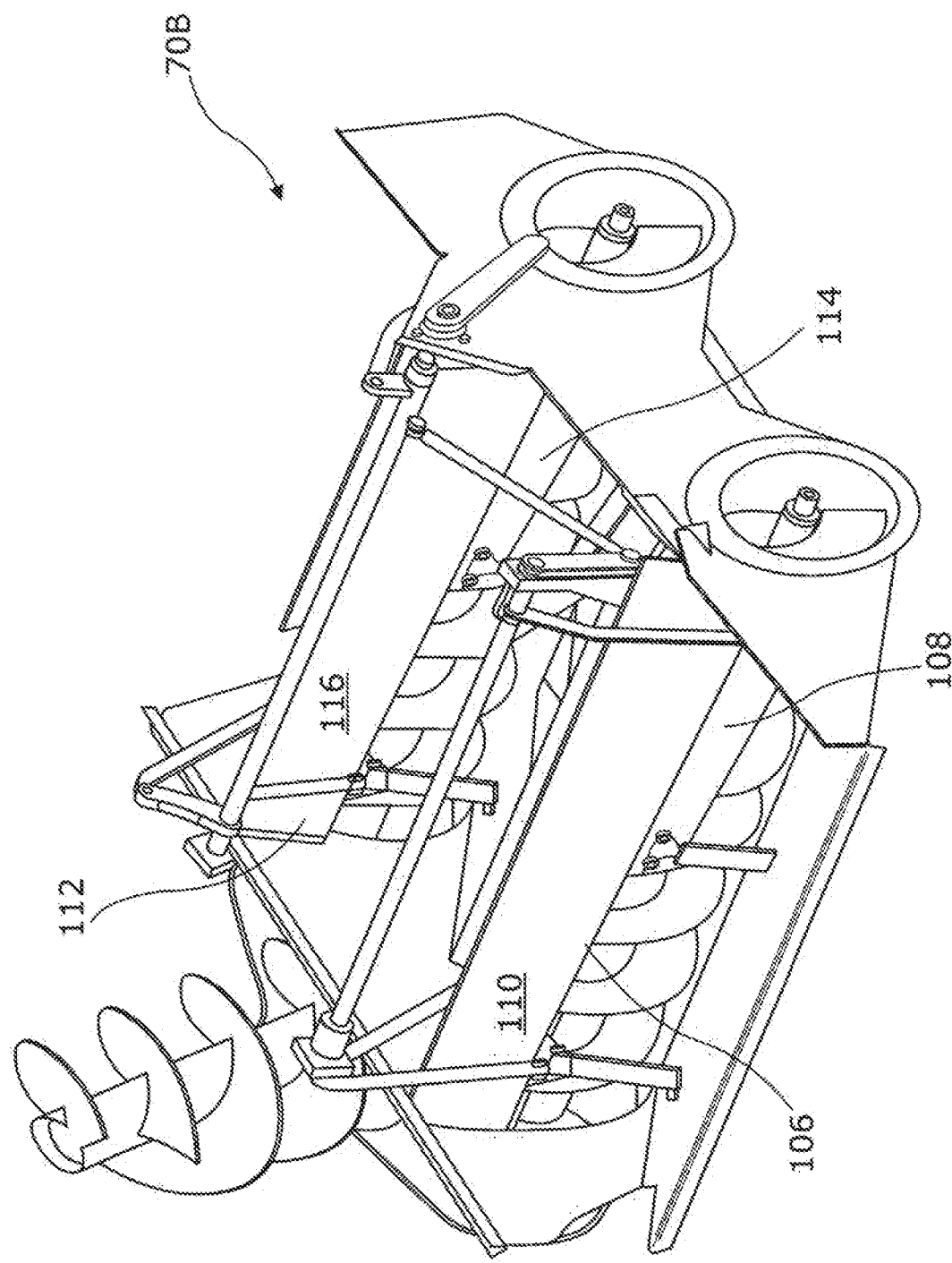

Having described an embodiment of the gate adjustment structure 70A where the shaft 50 is perpendicular to a respective longitudinal axis of the auger covers 46 and 48, attention is now directed to FIGS. 7A-7B, which illustrate another embodiment of a gate adjustment structure 70B where one or more rotatable shafts are used that are in parallel with the longitudinal axis of the auger covers. Note that in some embodiments, a different quantity of augers (e.g., a single auger) and auger covers may be used.

Referring to FIG. 7A, and beginning from the rear portion of the frame 24, a rotatable shaft 96 is shown that couples to the frame 24 (e.g., via a bushing), and in particular, the left side wall 30 of the frame 24. Fixably coupled to the shaft 96 are cranks 98 and 100. In the embodiment depicted in FIG. 7A, the crank 98 is longer than the crank 100, and the cranks 98 and 100 are configured as two parallel, angled brackets, similar to the cranks 52 and 72 (FIG. 5A) described previously. The cranks 98 and 100 are rotatably coupled (e.g., via a ball joint, ball bearings, pin, or roller, etc.) to respective link assemblies 102 and 104. The link assemblies 102 and 104 each comprise two (2) links (one shown for each link assembly 102 and 104, the other link from each obscured from view) that straddle an auger cover 106. The link assemblies 102 and 104 are secured (e.g., via a bracket) to each side of a bottom portion of gates of an auger cover 106, which partially covers the underlying auger 38. In one embodiment, the link assemblies 102 and 104 each comprises two (2) single rods or members, angled slightly in a manner to avoid interference with the auger cover 106 during raising and lowering of the gates of the auger cover 106. Each link of each of the link assemblies 102 and 104 are secured to moveable gates located on opposing (front and back) sides of the auger cover 106. Similar to the auger covers 46 and 48 (FIG. 5A) described previously, and as indicated generally above, the auger cover 106 comprises multiple segments, including a pair of gates 108 (visible gate 108A and a mirror image gate obscured from view) and a hat 110, similar to the configurations shown in FIG. 5A. The link assemblies 102 and 104 are secured to a lower portion of the gates 108 (108A and the other half, not shown), and when raised (via rotation of the shaft 96 and corresponding upward rotation of the cranks 98 and 100), causes the gates 108 to slide across the hat 110 in an upward motion or in some embodiments, upward rotation. The upward motion or rotation is a skewed motion according to the difference in length of the cranks 98 and 100 (the crank 98 longer than the crank 100), resulting in a larger gap at the bottom edges of the gates 108 on the left had side (when viewing FIG. 7A) versus the right hand side of the auger cover 106.

Further, in the depicted embodiment of FIG. 7A, a gap is shown (in the depicted lowered position) between approximately the entire left half, bottom edges of the gates 108 compared to the right half bottom edges of the gates 108. In some embodiments, the bottom edges of the gates 108 may be even (e.g., an equal amount of gap across the bottom edges of the entire auger cover 106 in the lowered position or no gap may be evident at all) in some embodiments, or in some embodiments, the gap may be present only on the right hand side bottom edges of the gates 108 of the auger cover 106. Actuation of the assembly for raising and lowering the auger cover 106 may be via a control system comprising a hydraulic cylinder(s) in cooperation with a control valve integrated, or associated, with an actuator, or via other motive sources and/or actuable devices (e.g., electric motors/actuators, mechanical, pneumatic, etc.).

The gate adjustment structure 70B further comprises a second auger cover 112 for the underlying auger 40. The auger cover 112 comprises multiple segments, including gates 114 (114A and a mirrored half not shown) and a hat 116, similar to that described for the auger cover 106. As shown, the gates 114 of the auger cover 112 are in the lowered position, with a gap on substantially the entire left hand half, bottom edges (e.g., between the frame 24 and the bottom edges of the gates 114). In some embodiments, the gap may be on the other bottom edges half of the gates 114 of the auger cover 112, or may be omitted in some embodiments. Also shown is a rotatable shaft 118 in parallel with the longitudinal axis of the auger cover 112. The shaft 118 is fixably coupled to cranks 120 and 122, where the crank 120 is longer than the crank 122 in the depicted embodiment. The cranks 120 and 122 are pivotably coupled to respective link assemblies 124 and 126. The link assemblies 124 and 126 each comprises two (2) links or rods or members that are in turn securely coupled to the lower portions of the gates 114 (e.g., 114A and the other (front) half obscured from view). In other words, there are four (4) connections of the link assemblies 124 and 126 to the gates 114, with two (2) connections shown in FIG. 7A to the rear-facing side of the gate 114 (114A) at locations proximal to the left and right hand side walls 30 and 32, and two (2) connections obscured from view on the opposing side (front) gate 114 proximal to the left and right hand side walls 30 and 32, similar to that described for connections to the gate 108. Also shown in FIG. 7A is a link 128, in this example located on the right hand side in FIG. 7A, that couples the movement of the shaft 118 and the shaft 96 to enable concurrent movement. In one embodiment, a hydraulic cylinder or other form of actuation may be coupled to the shaft 118 or the shaft 96 to cause rotation of the shafts 96 and 118. In some embodiments, a multiple cylinders may be used to enable independent action of the shafts 96 and 118.

Whereas FIG. 7A depicted the gate adjustment structures 70A in a lowered position, FIG. 7B shows the gate adjustment structures 70B in a raised position. Note that, contrary to the gate adjustment structure 70A depicted in FIGS. 5A and 5B, the gates 108 and 114 of the auger covers 106 and 112 for the gate adjustment structure 70B slide across the interior (as opposed to the exterior) side of the respective hats 110 and 116. In other words, movement of the gates 108 and 114 is guided by the structure of the hats 110 and 116, respectively. Also noteworthy is the opening of the gates 108 and 114 is skewed, with a greater gap on the left hand side of the auger covers 106 and 112 than on the right hand side.

Note that in the depicted embodiments of FIGS. 7A-7B, actuation may be achieved via a lever and hydraulic cylinder assembly and actuable control valve (or other forms of actuation, such as electrical, pneumatic, etc.), similar to that depicted from the hydraulic cylinder 68 and lever 58 (FIG. 2C), that is controlled from the cab 14 (FIG. 1) of the combine harvester 10 (FIG. 1). In some embodiments, actuation (for embodiments 70A and 70B) may be achieved in more rudimentary fashion, such as via a manual lever, or via local control (e.g., switch and circuitry) that is proximal to the gate adjustment structures 70A and 70B (e.g., outside of the cab 14).

Figure 8A:
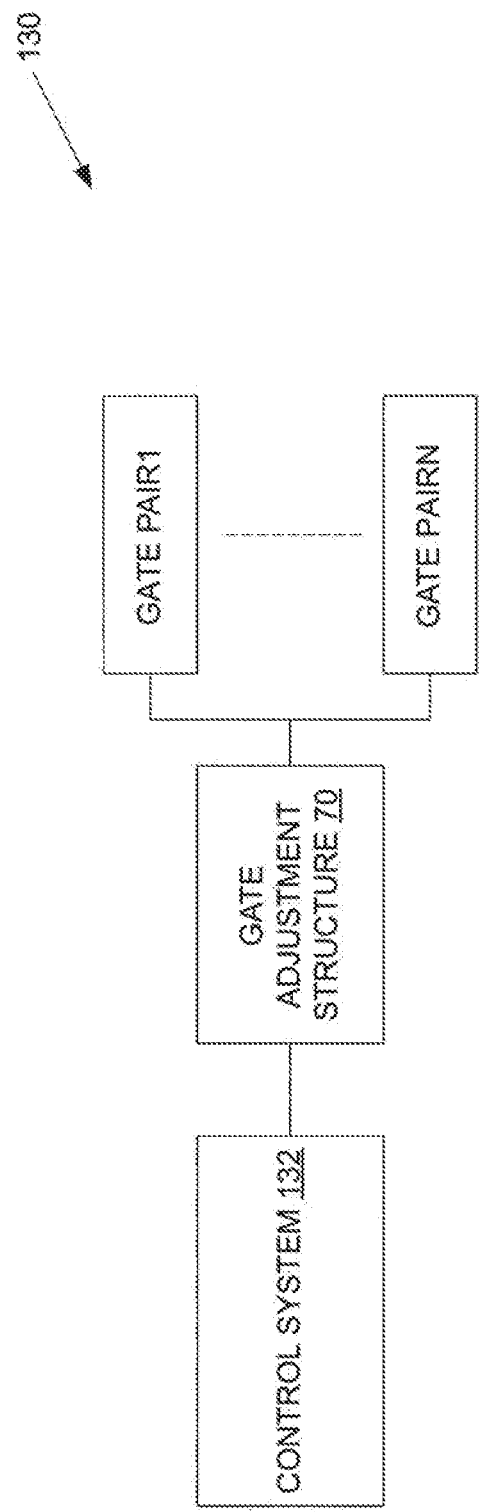
FIG. 8A is a block diagram that illustrates an embodiment of a grain flow rate control system.

FIG. 8A illustrates a general block diagram of an embodiment of a grain flow rate control system 130. The grain flow rate control system 130 comprises a control system 132, the gate adjustment structure 70 (e.g., either 70A or 70B, FIGS. 3-7B), and one or more pairs of gates (e.g., plural gate pairs 76A, 76B and 78A, 78B of FIG. 5A, or plural gate pairs 108A, 108B and 114A, 114B) of the associated one or more auger covers. The grain flow rate control system 130 comprises one or more electronic control units (ECUs), one or more actuable devices, and one or more sensors. For instance, assuming a hydraulic control system and the gate adjustment structure 70A (FIG. 5A), the grain flow rate control system 130 may comprise an ECU coupled to an actuable control valve of a hydraulic circuit that also includes the hydraulic cylinder 68 (FIG. 2C). The ECU signals the actuable control valve (e.g., a solenoid of the actuable control valve) to adjust the internal flow control mechanisms (e.g., spool) of the control valve, which in turn adjusts hydraulic fluid flow to ports of the hydraulic cylinder in known manner, resulting in actuation of the hydraulic cylinder (e.g., extension or retraction of the piston rod of the hydraulic cylinder). In one embodiment, the actuation of the hydraulic cylinder in turn causes, through coupling to the lever 58 (FIG. 2A) of the gate adjustment structure 70 (e.g., 70A), rotation of the lever 58. The lever action in turn causes a rotation of the shaft 50 (FIG. 5A), which in turn causes a continuously variable or incremental adjustment of the plural pairs of gates 76 and 78 of the respective plural auger covers 46 and 48 (FIG. 5A).

Figure 8B:
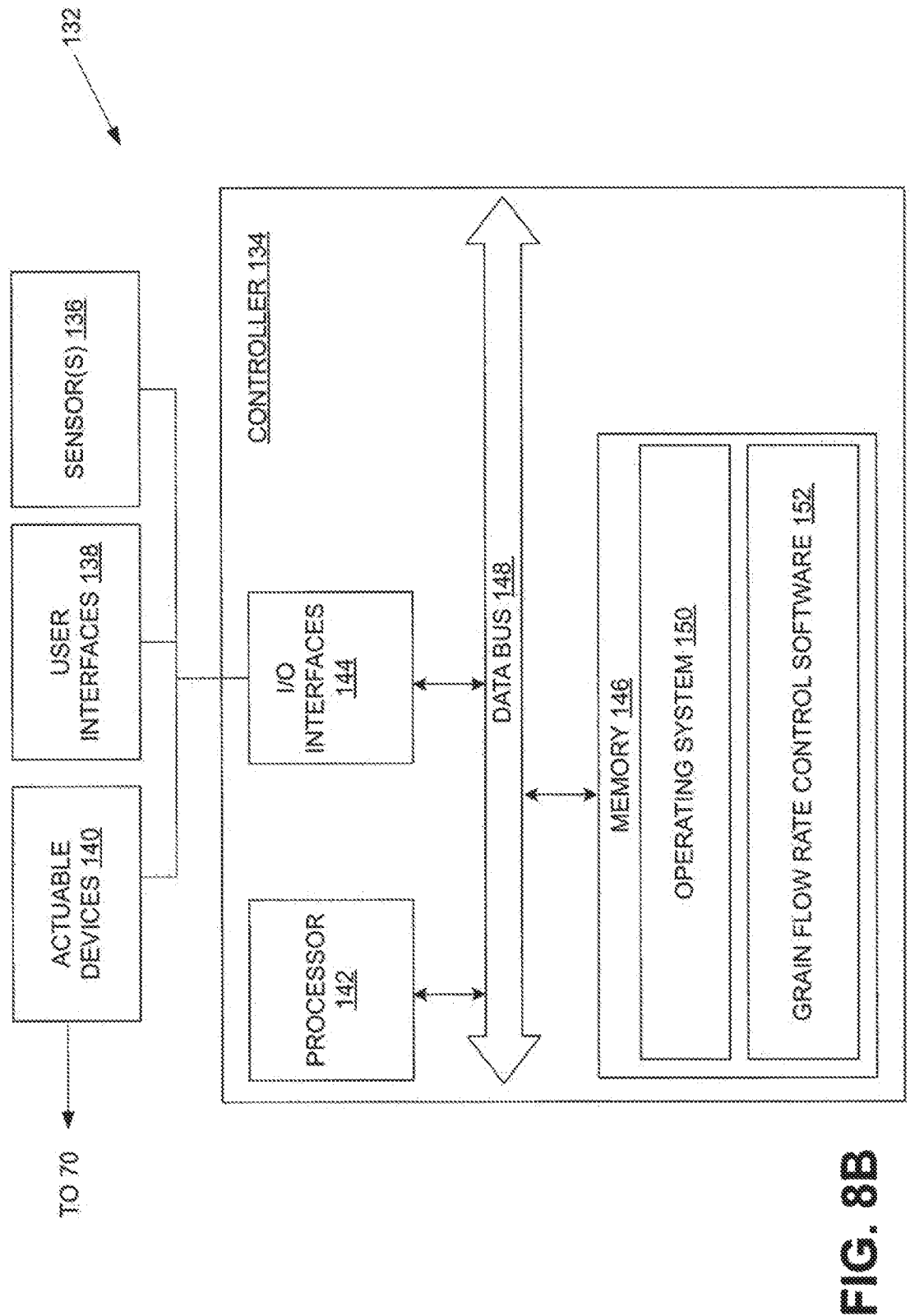
FIG. 8B is a block diagram that illustrates an embodiment of an example control system depicted in FIG. 8A.

Referring now to FIG. 8B, shown is an embodiment of an example control system 132 depicted in FIG. 8A. The control system 132 comprises a controller 134 coupled to one or more sensors 136, user interfaces 138, and actuable or controlled devices 140, which in turn are coupled to the gate adjustment structure 70 as shown in FIG. 8A. In some embodiments, the sensors 136 may be located proximal to components of the gate adjustment structure 70. In some embodiments, the sensors 136 may be located external to the combine harvester 10 (FIG. 1), such as on an accompanying vehicle, such as a grain cart or truck to monitor the fill level (the grain level) of the cart or truck in real time. Note that actuation of the gates of the auger covers may be achieved in some embodiments in more rudimentary fashion, such as via manual lever or more rudimentary circuitry. One having ordinary skill in the art should appreciate in the context of the present disclosure that the example controller 134 is merely illustrative, and that some embodiments of controllers may comprise fewer or additional components, and/or some of the functionality associated with the various components depicted in FIG. 8B may be combined, or further distributed among additional modules or controllers, in some embodiments. Further, it should be appreciated that, though described in the context of residing in a single controller 134 (e.g., electronics control unit or ECU), functionality of the controller 134 may be distributed among a plurality of controllers in some embodiments, and in some embodiments, one or more of the functionality of the controller 134 may be achieved remote from the combine harvester 10 (e.g., FIG. 1, where the combine harvester 10 has telecommunications and/or internet connectivity functionality). The controller 134 is depicted in this example as a computer system, but may be embodied as a programmable logic controller (PLC), field programmable gate array (FPGA), application specific integrated circuit (ASIC), among other devices.

It should be appreciated that certain well-known components of computer systems are omitted here to avoid obfuscating relevant features of the controller 134. In one embodiment, the controller 134 comprises one or more processors, such as processor 142, input/output (I/O) interface(s) 144, and memory 146, all coupled to one or more data busses, such as data bus 148. The memory 146 may include any one or a combination of volatile memory elements (e.g., random-access memory RAM, such as DRAM, and SRAM, etc.) and nonvolatile memory elements (e.g., ROM, hard drive, tape, CDROM, etc.). The memory 146 may store a native operating system, one or more native applications, emulation systems, or emulated applications for any of a variety of operating systems and/or emulated hardware platforms, emulated operating systems, etc.

In the embodiment depicted in FIG. 8B, the memory 146 comprises an operating system 150 and grain flow rate control software 152. It should be appreciated that in some embodiments, additional or fewer software modules (e.g., combined functionality) may be deployed in the memory 146 or additional memory. In some embodiments, a separate storage device may be coupled to the data bus 148, such as a persistent memory (e.g., optical, magnetic, and/or semiconductor memory and associated drives). The storage device may be a removable device, such as a memory stick or disc.

In one embodiment, the grain flow rate control software 152 is executed by the processor 142 to receive user input at the user interfaces 138 (e.g., one or a combination of console button, switch, knob, hydro handle or joystick, scroll wheel, selectable icon displayed on a screen that is manipulated by a mouse or joystick, selectable icon on a touch-type screen, microphone on a headset or on the console, etc.), match or associate (e.g., via look-up table or in some embodiments via programmed switch position activation) the input with a corresponding grain unloading function (e.g., engage/disengage the unloading system, increase or decrease or stop grain flow from the grain bin 16 (FIG. 1), etc.), and actuate one or more actuable devices 140 (e.g., one or more control valves and the hydraulic cylinder 68 (FIG. 2C), one or more electric actuator/motor, etc.) to cause a raising or lowering of the lever 58 (FIG. 2C) or other mechanism of the gate adjustment structure 70 to cause rotation of the shaft or shafts of the gate adjustment structure 70, which in turn effectuates the raising or lowering of the gates of the auger covers and adjustment of grain flow.

Note that the input at the user interfaces 138 may correspond to the operator turning the unload system of the combine harvester 10 (FIG. 1) off, resulting in automatic closing of the gates of the auger covers. The automatic closing of the gates may prevent grain from packing around the augers 38, 40 (FIG. 4) while, for instance, the combine harvester 10 is bouncing across a field (these measures accordingly reduce peak startup torque when the grain unloading function is engaged). The input at the user interfaces 138 may correspond to crop selection (e.g., from a list of selectable crops presented on a display device) for the operator to choose from, which in turn is interpreted by the grain flow rate control software 152 as a predetermined required setting of the gate positions, and accordingly, the grain flow rate control software 152 causes the adjustment of the one or more pairs of gates of the auger covers. As noted above, the inputs may be received from a user interface 138 (e.g., a switch, button, knob, scroll wheel on the console or on a hydro handle or joystick, an icon selection on or associated with a graphical user interface, microphone, etc.) and corresponding signals delivered via the I/O interfaces 134 to the grain flow rate control software 152 executing on the processor 142. A lookup table (or other form of data structure in some embodiments) may be stored in memory 146 when used to translate the input (e.g., moisture level or crop type) to a corresponding function (changing the position settings of the one or plural pairs of gates). The output is provided to the controlled (actuable) devices 140, which in turn causes control operations of the gate adjustment structure 70 as described above to implement the changed settings. Note that adjustment of gate pairs of respective auger covers may be achieved independently in some embodiments, or concurrently.

In some embodiments, the sensors 136 provide input to the grain flow rate control software 152 (via the I/O interfaces 144) to cause gate adjustment. For instance, signals from moisture sensors, gate position sensors, or signals from accompanying vehicle sensors (e.g., which monitor grain fill level in the bed of a truck, for instance) may be received via the I/O interfaces 144 by the grain flow rate control software 152, and used to adjust settings of the one or plural pairs of gates of the auger cover(s). In some embodiments, the sensed levels embodied as signals sent (wirelessly) to the controller 134 may be used to implement a soft stop through variable adjustment and/or stepped-down adjustment of the gate positions. Note that at start-up, in some embodiments, the grain flow rate control software 152 may cause variable positioning of one or plural pairs of gates corresponding to one or more auger covers, resulting in a soft start for unloading the grain from the grain bin 16 (FIG. 1). The sensors 136 also may be used to monitor the gate positions, enabling a feedback of the positions to the grain flow rate control software 152 and adjustment as required for a given application or as directed by an operator through the user interfaces 138.

Execution of the grain flow rate control software 152 may be implemented by the processor 142 under the management and/or control of the operating system 150. For instance, as is known, the source statements that embody the method steps or algorithms of the grain flow rate control software 152 may be translated by one or more compilers of the operating system 150 to assembly language and then further translated to a corresponding machine code that the processor 142 executes to achieve the functionality of the grain flow rate control software 152. Variations of this execution process are known, depending on the programming language of the software. For instance, if Java-based, the compiled output may comprise bytecode that may be run on any computer system platform for which a Java virtual machine or bytecode interpreter is provided to convert the bytecode into instructions that can be executed by the processor 142. Also, register transfer language (or other hardware description language) may be used to translate source code to assembly language, which the one or more operating system compilers translate to executable machine code. In some embodiments, the operating system 150 may be omitted and a more rudimentary manner of control implemented. The processor 142 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 134.

The I/O interfaces 144 provide one or more interfaces to one or more devices, such as the actuable devices 140, the user interfaces 138, the sensors 136, among other devices that are coupled directly or indirectly (e.g., over a bus network, such as a CAN network, including one operating according to ISO-bus) to the controller 134. The I/O interfaces 144 may also comprise functionality to connect to other networks. For instance, the I/O interfaces 144 may include a network interface that enables remote or wireless communications, such as via well-known telemetry functionality, Blue-tooth communications, near-field, among other electromagnetic spectrum communications.

When certain embodiments of the controller 134 are implemented at least in part with software (including firmware), as depicted in FIG. 8B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the controller 134 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 9:
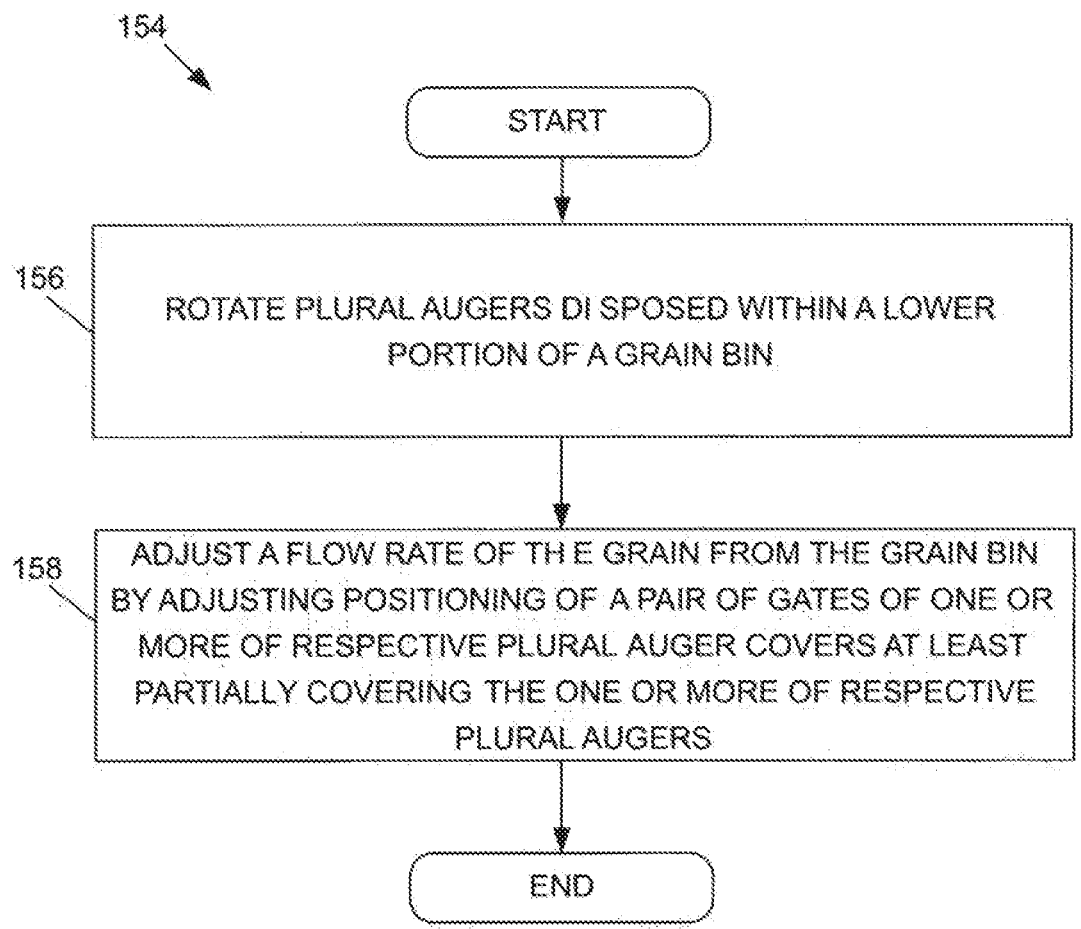
FIG. 9 is a flow diagram that illustrates an embodiment of an example grain flow rate control method.

Having described some example embodiments of a grain flow rate control system 130, it should be appreciated in view of the present disclosure that one embodiment of a grain flow rate control method, the method depicted in FIG. 9 and denoted as method 154, comprises rotating plural augers disposed within a lower portion of a grain bin (156); and adjusting a flow rate of the grain from the grain bin by adjusting positioning of a pair of gates of one or more of respective plural auger covers at least partially covering the one or more of respective plural augers (158).

Any process descriptions or blocks in flow charts should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A grain unloading system for a combine harvester comprising:
   a grain bin comprising a frame, the frame comprising a floor with a trough disposed therein;
   an unloading auger disposed at least partially within the trough;
   an auger cover that at least partially covers the auger, the auger cover comprising a hat for a top portion of the auger cover and a pair of gates movable between the hat and locations on the floor that are proximal to the trough;
   a gate adjustment structure coupled to the pair of gates to move the pair of gates relative to the auger, wherein the gate adjustment structure comprises:
   a rotatable shaft;
   a first crank rigidly affixed to the rotatable shaft;
   a second crank rigidly affixed to the rotatable shaft;
   a first link assembly coupled between the first crank and one gate of the pair gates;

a second link assembly coupled between the second crank and an other gate of the pair of gates, wherein the first and second link assemblies comprise respective first and second links that straddle the auger cover and are each pivotably secured to its respective gate of the pair of gates; and, a control system coupled to the gate adjustment structure and configured to control the gate adjustment structure, wherein when the control system causes the gate adjustment structure to move the pair of gates to a maximum closed position, a gap remains between the floor and a bottom edge of each of the pair of gates.

2. A grain unloading system according to claim 1, wherein the floor comprises plural troughs in which a respective unloading auger is at least partially disposed, and wherein respective auger covers and gate adjustment structures are provided for each auger.

3. A grain unloading system according to claim 1, wherein the control system comprises a user interface, wherein responsive to receiving a predetermined operator input at the user interface corresponding to deactivation of a grain unloading function, the control system is configured to cause the gate adjustment structure to move the gates to a closed position.

4. A grain unloading system according to claim 2, wherein the control system further comprises a sensor to detect the position of the gates of at least one of the auger covers.

5. A grain unloading system according to claim 1, wherein the control system further comprises a user interface, wherein responsive to receiving a predetermined operator input at the user interface corresponding to selection of a crop type among a plurality of selectable crop types, the control system is configured to cause the gate adjustment structure to move the gates to a predetermined position.

6. A grain unloading system according to claim 1, wherein the control system is configured to receive a signal from a remote device, the signal comprising information corresponding to a level of fullness of a vehicle for receiving grain from the grain bin, wherein responsive to the signal, the control system is configured to cause the gate adjustment structure to move the gates to a predetermined position.

7. A grain unloading system according to claim 2, wherein the control system is configured to receive a signal corresponding to grain unloading activation, wherein responsive to the signal, the control system is configured to cause the gate adjustment structure to variably adjust the movement of the pair of gates of at least one of the auger covers.

8. A grain unloading system according to claim 1, wherein the rotatable shaft is substantially perpendicular to the auger cover.

9. A grain unloading system according to claim 1, wherein the first and second links are pivotably secured at only one end of the auger cover.

10. A grain unloading system according to claim 1, wherein in response to a first rotation of the rotatable shaft, one end of the pair of movable gates moves up to a predetermined distance that is greater than a predetermined distance the other end of the pair of movable gates moves up to.

11. A grain unloading system for a combine harvester comprising:
a grain bin comprising a frame, the frame comprising a floor with a trough disposed therein;
an unloading auger disposed at least partially within the trough;
an auger cover that at least partially covers the auger, the auger cover comprising a hat for a top portion of the auger cover and a pair of gates movable between the hat and locations on the floor that are proximal to the trough;
a gate adjustment structure coupled to the pair of gates to move the pair of gates relative to the auger; and
a control system coupled to the gate adjustment structure and configured to control the gate adjustment structure, wherein the gate adjustment structure comprises:
a rotatable shaft;
a first crank rigidly affixed to the rotatable shaft;
a second crank rigidly affixed to the rotatable shaft, wherein the first crank is longer than the second crank;
a first link assembly coupled between the first crank and one gate of the gates; and
a second link assembly coupled between the second crank and an other gate of the pair of gates, wherein the first and second link assemblies comprise respective first and second links that straddle the auger cover and are each pivotably secured to its respective gate of the pair of gates.

12. A grain unloading system according claim 1, wherein the floor comprises plural troughs in which a respective unloading auger is at least partially disposed, and wherein respective auger covers and gate adjustment structures are provided for each auger, further comprising:
a second rotatable shaft;
a set of cranks rigidly affixed to the second rotatable shaft; and
a set of link assemblies respectively coupled between the set of cranks and a pair of second movable gates of a second auger cover.

13. A grain unloading system according claim 1, wherein the floor comprises plural troughs in which a respective unloading auger is at least partially disposed, and wherein respective auger covers and gate adjustment structures are provided for each auger, further comprising:
a second rotatable shaft;
a set of cranks rigidly affixed to the second rotatable shaft; and
a set of link assemblies respectively coupled between the set of cranks and a pair of second movable gates of a second auger cover;
wherein the first rotatable shaft is substantially parallel to the first auger cover and the second rotatable shaft is substantially parallel to the second auger cover.

* * * * *